Feb. 2, 1954     L. A. IHLEIN     2,667,854
CURB FINDER FOR MOTOR VEHICLES
Filed Jan. 26, 1953
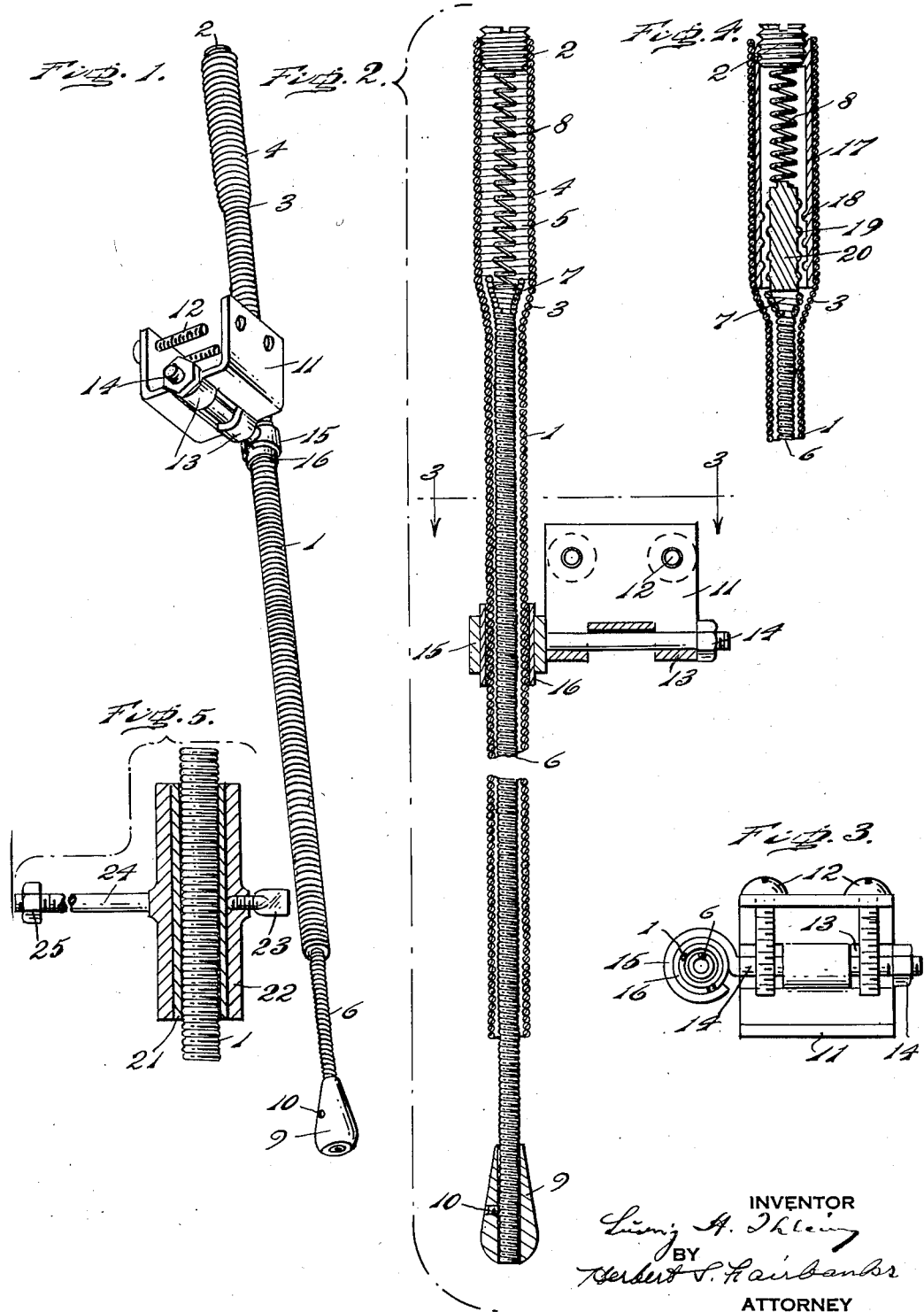
INVENTOR
Ludwig A. Ihlein
BY Herbert S. Fairbanks
ATTORNEY Patented Feb. 2, 1954

2,667,854

UNITED STATES PATENT OFFICE 2,667,854

CURB FINDER FOR MOTOR VEHICLES

Ludwig A. Ihlein, Philadelphia, Pa.

Application January 26, 1953, Serial No. 333,190

4 Claims. (Cl. 116—28)

In my prior patent, No. 2,561,865, I have disclosed and broadly claimed a novel curb finder for motor vehicles, which will facilitate the parking of a motor vehicle in proximity to a street curb by signalling to the driver that he is close to the curb.

The object of this invention is to devise a curb finder of the same general type as that of my prior patent above identified but to construct it of a minimum of parts and of improved construction so that the curb finder can be economically manufactured, mounted and removed or adjusted by unskilled labor and be efficient in producing a desired signal.

A further object of the invention is to devise a novel mounting cooperating with a novel body portion within which a flexible coil spring has limited movement and cooperates with a novel signal.

With the foregoing and other objects in view as will hereinafter clearly appear, my invention comprehends a novel curb finder for motor vehicles.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized and the invention is not limited to the exact arrangement and organization of these instrumentalities except by the scope of the appended claims.

Figure 1 is a perspective view of a curb finder for motor vehicles, embodying my invention.

Figure 2 is a longitudinal section.

Figure 3 is a section on lines 3—3 of Figure 2.

Figure 4 is a sectional detail of another embodiment of the invention with signalling means.

Figure 5 is a sectional view of another embodiment of mounting.

Similar numerals of reference indicate corresponding parts.

Referring to the drawings:

The body portion 1 of the curb finder is in the form of a helical coil open at its ends and having its upper end closed by means of a threaded plug 2. The body portion near its upper end is flared outwardly as at 3 and then extends upwardly in cylindrical form as at 4, forming an enlarged chamber 5. A coiled spring 6 is longitudinally and freely slidable within the body portion with the lower end depending below the lower end of the body portion. This spring 6 has its upper end flared outwardly and upwardly as at 7 so that the downward movement is limited by the spring 6 by its contact with the flared portion 3 of the body portion, which forms a stop to limit downward movement of such spring. The spring 6 is normally retained in its downward position by a spring 8 interposed between the plug 2 and the top of the spring 6.

A rounded weight 9 is fixed by a set screw 10 on the inner spring 6.

A mounting 11 in the form of a U shaped casting or stamping has threaded bolts 12 passing through its sides to secure the mounting to a fender construction of a motor vehicle. The body portion of the mounting has ears 13 to receive a bolt 14 having a split head 15 within which is a sleeve 16 adjustable on the spring 6. The bolt 14 is provided with a conventional nut as shown so that the body portion 1 can be locked to the mounting in the position to which it has been longitudinally and rotatably adjusted. It will thus be clear that the body portion is longitudinally adjustable in the mounting and also can be adjusted for any desired angular position relatively to the mounting. In the form shown in Figure 2, the spring 6 will vibrate in the chamber 8 and the flared end of the inner coil spring 6 will contact the wall of the chamber to produce a signal when the weight 9 is contacting the curb as the motor vehicle moves along the curb.

In the embodiment shown in Figure 4, I have shown a different type of signal. A cylinder 17 has a friction fit in the chamber 6 and is provided with indentations or reeds 18 which cooperate with indentations or reeds 19 on a member 20 seated on the upper end of the inner coil spring 6.

In the embodiment of mounting shown in Figure 5, a sleeve 21 is within a cylindrical mounting 22, and a set screw 23 fixes the sleeve and mounting in adjusted position on the outer spring coil 1. A rod extends laterally from the mounting as at 24 and this rod is threaded and passes through the ears 13 of the member 11 shown in Figures 1, 2 and 3.

The mounting 11 is thus angularly adjustable on the rod 24 and fixed in its adjusted position by a nut 26, and this can be done without changing the longitudinally adjusted position of the tube or sleeve 22 on the outer coiled spring 1. In Figures 1, 2 and 3, the clamping of the mounting on the outer coiled spring fixes the outer coiled spring in both its longitudinally and angularly adjusted position.

It will thus be clear that the operator of the motor vehicle can adjust the position of the springs for any road operating conditions, for example when there is deep snow the outer coiled spring can be raised so that the springs will not be injured by contact with obstructions.

Due to its novel construction, the bracket and its means to lock it to the outer coiled spring, a single bracket can be employed for a right hand or left hand fender, and the open end of the bracket can be directed upwardly or downwardly depending on the part of the vehicle to which it is to be attached. To change from a right hand to a left hand fender, the bracket is turned upside down and the bolts inserted through the upper side of the bracket.

The inner coiled spring is free to rise and fall within determined ranges and free to revolve. As the motor vehicle rolls along the curb the inner coiled spring in contact with the curb will revolve or raise and lower, and the sound produced by the contact of the coiled springs or the sound producer will be audible to the operator of the motor vehicle.

By the employment of an inner and an outer coiled spring, a very flexible and strong construction is provided which is free to flex substantially throughout the length of such springs.

Having thus described my invention, what I claim as new and desire to secure by Letters Patent is:

1. In a curb finder for motor vehicles, a body portion in the form of an outer coiled spring deflected outwardly near its upper end to form a stop, an inner coiled spring freely movable in the outer spring and shaped at its upper end to engage said stop and limit downward movement of the inner spring, a plug closing the upper end of the outer spring, a spring interposed between said plug and the upper end of the inner spring, and a mounting attachable to a motor vehicle and on which said outer spring is longitudinally and angularly adjustable.

2. In a curb finder for motor vehicles, an outer coiled spring enlarged near its upper end and forming a seat at the bottom of such enlargement, an inner coiled spring slidable within the outer spring and having means at its upper end to engage said seat and thereby limit downward movement of the inner spring, a sound reproducing device having a movable part contacting said inner spring, a plug closing the upper end of the outer spring, and a spring interposed between said plug and said movable part.

3. In a curb finder for motor vehicles, a bracket having side flanges forming a space to receive a part of a fender construction and attachable to a right or left hanger part of such construction by turning the bracket upside down, bolts engaging the flanges to fix the bracket to such part, an outer coiled spring rotatable and angularly adjustable on said bracket, and an inner coiled spring free to revolve within said outer spring and having limited longitudinal movement therein.

4. In a curb finder, an outer coiled spring enlarged at its upper end to form a chamber with a bottom opening of reduced diameter to provide a shoulder, an inner coiled spring slidable within said outer spring and having at its upper end an enlarged diameter to provide a stop to engage said shoulder and limit downward movement of the inner spring within the outer spring, a closure for the upper end of the outer spring, a spring in said chamber between the closure and the inner spring, and a mounting for attaching said outer spring to a motor vehicle.

LUDWIG A. IHLEIN.

References Cited in the file of this patent

UNITED STATES PATENTS

| Number | Name | Date |
|---|---|---|
| 2,281,806 | Schulman | May 5, 1942 |
| 2,482,630 | Mastromarino | Sept. 20, 1949 |
| 2,561,865 | Ihlein | July 24, 1951 |